US012169742B2

(12) United States Patent
Barletta et al.

(10) Patent No.: US 12,169,742 B2
(45) Date of Patent: Dec. 17, 2024

(54) DEPLOYED APPLICATION PROGRAMMING INTERFACE MANAGEMENT

(71) Applicant: Salesforce, inc., San Francisco, CA (US)

(72) Inventors: Patricio Barletta, Brentwood, CA (US); Gaurav Sagar, Bellevue, WA (US); Antonio Garrote, San Francisco, CA (US); Brian Florentin, Costa del Este (AR); Ezequiel Block, Pilar (AR)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/817,468

(22) Filed: Aug. 4, 2022

(65) Prior Publication Data

US 2024/0045745 A1    Feb. 8, 2024

(51) Int. Cl.
*G06F 9/02* (2006.01)
*G06F 9/50* (2006.01)
*G06F 9/54* (2006.01)
*H04L 9/40* (2022.01)
*H04L 67/02* (2022.01)
*H04L 67/10* (2022.01)

(52) U.S. Cl.
CPC ............ *G06F 9/547* (2013.01); *G06F 9/5072* (2013.01); *H04L 63/0815* (2013.01); *H04L 63/104* (2013.01); *H04L 67/02* (2013.01); *H04L 67/10* (2013.01)

(58) Field of Classification Search
CPC ... G06F 9/547; G06F 9/5072; H04L 63/0815; H04L 63/104; H04L 67/02; H04L 67/10
See application file for complete search history.

(56) References Cited

U.S. PATENT DOCUMENTS

| | | | |
|---|---|---|---|
| 8,856,957 B1 * | 10/2014 | Roth ....................... | G06F 21/33 726/28 |
| 11,418,393 B1 * | 8/2022 | Soby ................... | H04L 63/1441 |
| 2012/0110651 A1 * | 5/2012 | Van Biljon ........... | H04L 63/101 709/201 |
| 2014/0229614 A1 * | 8/2014 | Aggarwal ........... | H04L 65/1063 709/224 |
| 2014/0279489 A1 * | 9/2014 | Russell ................. | H04L 63/105 705/42 |
| 2016/0112397 A1 * | 4/2016 | Mankovskii .......... | H04L 63/105 726/6 |

(Continued)

*Primary Examiner* — Michael W Ayers
*Assistant Examiner* — Abdou K Seye
(74) *Attorney, Agent, or Firm* — Holland & Hart LLP

(57) ABSTRACT

Methods, apparatuses, and computer-program products are disclosed. The method may include deploying a runtime agent onto a private compute architecture for running one or more federated application programming interfaces (APIs) on the private compute architecture. The method may include receiving, via a user interface of a federation management service, user input to manage an operation of the one or more federated APIs, where the federation management service is hosted on public cloud-based resources. The method may include communicating, based on the user input, control signaling between the runtime agent and a runtime manager that is hosted on a control plane of the federation management service in the public cloud-based resources.

20 Claims, 11 Drawing Sheets

(56) References Cited

U.S. PATENT DOCUMENTS

| | | | | |
|---|---|---|---|---|
| 2016/0132214 | A1* | 5/2016 | Koushik | G06F 8/61 |
| | | | | 715/741 |
| 2016/0321572 | A9* | 11/2016 | Martinez | H04L 67/10 |
| 2021/0306325 | A1* | 9/2021 | Olden | H04L 63/102 |
| 2023/0315840 | A1* | 10/2023 | Cambric | H04L 63/14 |
| | | | | 726/23 |

* cited by examiner

DEPLOYED APPLICATION PROGRAMMING INTERFACE MANAGEMENT

FIELD OF TECHNOLOGY

The present disclosure relates generally to data processing, and more specifically to deployed application programming interface management.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant data processing system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cloud platform scenarios, federated data sources may be managed in various ways. However, such methods may be improved.

DETAILED DESCRIPTION

Existing application programming interface (API) federation management services are either managed and run completely in public cloud resources or are completely managed and run on local or private infrastructure by the customer (e.g., through the user of binary files that are managed by the customer). Some customers may not allow their federated APIs or source data to run on a system that is connected to the Internet or other publicly-accessible resources, therefore requiring at least some of the federated APIs to run on private infrastructure. However, running and managing federated API services on private infrastructure may involve the customer deploying and managing binaries or other file types.

The subject matter described herein may include techniques for deploying a federated API onto the local infrastructure of a customer, but still retaining the management of the federated API (e.g., via a control plane) on cloud-based resources. Specifically, a runtime agent (e.g., runtime fabric (RTF) or similar technology) may be deployed directly onto the customer's local infrastructure (e.g., onto a processing cluster). The runtime agent on the local infrastructure may communicate directly with a runtime manager in the cloud-based control plane, thereby enabling the same management capabilities as if the federated API were deployed directly onto the cloud-based resources. This configuration also provides for seamless migration of the deployment target between cloud-based and local resources.

Additionally, or alternatively, the subject matter described herein may include techniques for determining multiple API operations for the federated APIs or other resources deployed on the local infrastructure. Further, a user may configure API federation parameters to be processed or implemented at the federated APIs through the control plane. In some examples, the runtime agent may monitor activities of the one or more federated APIs and generate logging information that may be transmitted.

Aspects of the disclosure are initially described in the context of an environment supporting an on-demand database service. Aspects of the disclosure are then described in the context of a computing environment, an API management scheme, and a process flow. Aspects of the disclosure are further illustrated by and described with reference to apparatus diagrams, system diagrams, and flowcharts that relate to deployed application programming interface management.

Figure 1:
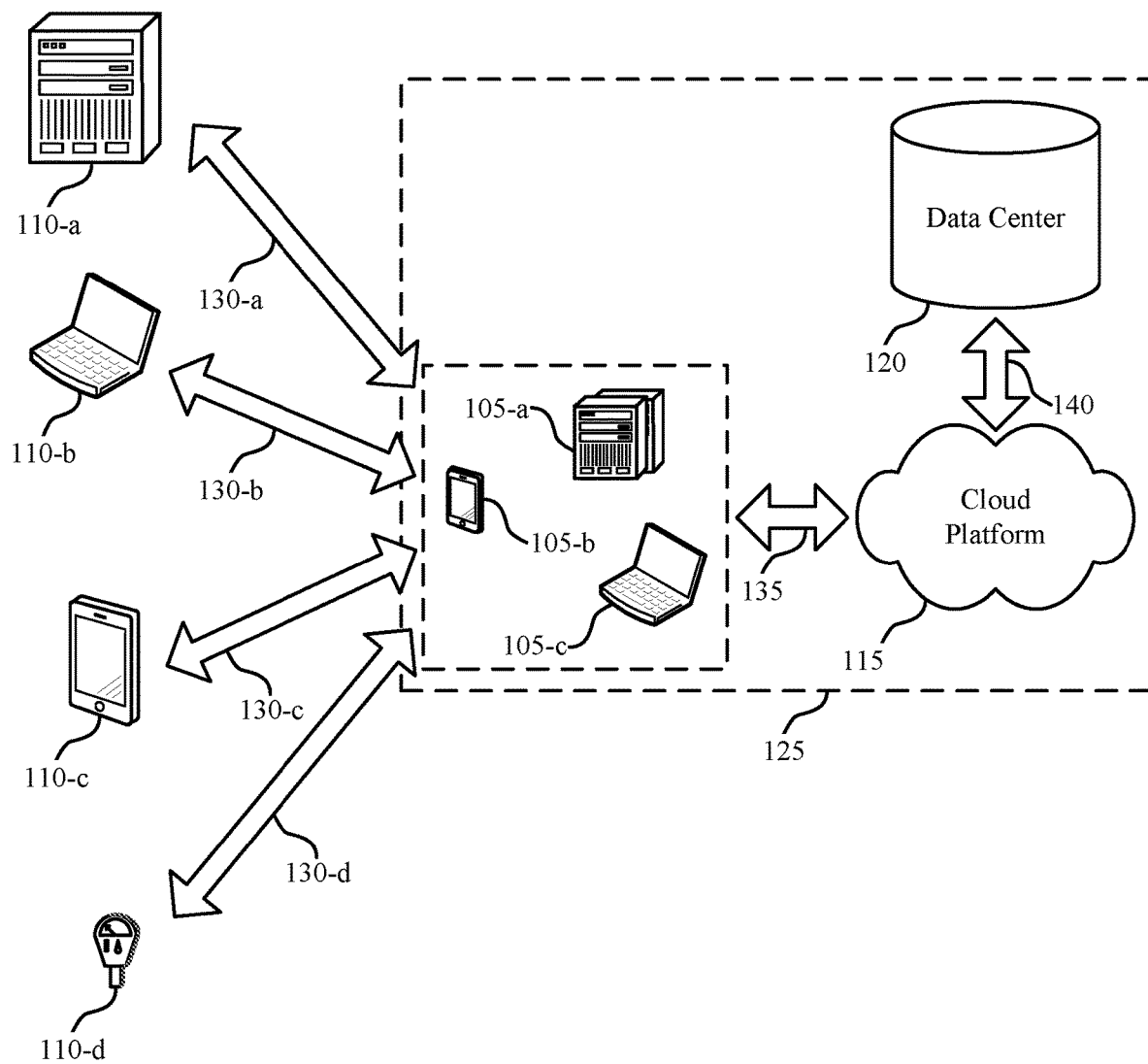
FIG. 1 illustrates an example of a data processing system that supports deployed application programming interface (API) management in accordance with examples as disclosed herein.

FIG. 1 illustrates an example of a system 100 for cloud computing that supports deployed application programming interface management in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

For example, in some implementations, the cloud platform 115 may include or communicate with a federation management service. The cloud platform 115 may deploy a local runtime agent on a local infrastructure on which one or more federated APIs, associated processing, or both may be operated. In some examples, a cloud client 105 may communicate with the cloud platform 115 (e.g., with the federation management service) to manage one or more operations of the federated APIs that are operating on the local infrastructure. The cloud platform 115 may communicate with the local runtime agent to manage the federated APIs in accordance with the instructions received from the cloud client 105.

In some API federation management approaches, the management of federated APIs and the operation of those APIs are both performed on the same infrastructure. For example, many federated APIs and management thereof are performed on publicly-accessible cloud resources. In other cases, the federated APIs are operated solely on private infrastructure, sometimes for reasons of data security, access restrictions, or other reasons. In such cases, management of these APIs involves significant customer action (e.g., deploying, configuring, and managing binaries).

The subject matter discussed herein describes techniques for operating a federated API on private infrastructure and deploying a runtime agent alongside the federated APIs on the private infrastructure. The runtime agent may communicate with a control plane (e.g., that includes a federation management service) that operates on a public cloud infrastructure and may offer similar management capabilities that would be present if the federated APIs were also deployed on the public cloud infrastructure. In this way, deployment, configuration, and management of binaries and other complications may be handled as if the federated APIs were deployed on the public cloud infrastructure, while still maintaining the security requirements, access restrictions, or other considerations that necessitated the use of the private infrastructure.

For example, a user that may wish to run federated APIs on a private infrastructure (e.g., for data security or access restriction reasons) may use a federated management service (e.g., operating on a control plane on a public cloud infrastructure) to communicate with a runtime agent deployed on the private infrastructure. The user may issue commands or retrieve information from the federated management service, and the federated management service may communicate with the runtime agent deployed on the private infrastructure to manage operation, configuration, monitoring, or other operations of the federated APIs. In some examples, operations that might otherwise involve the deployment, configuration, and management of binaries directly on the private infrastructure may be performed by the runtime agent that is in communication with the federated management service that provides the user interface and reporting functions, all while maintaining the security or access restrictions that may be maintained by using the private infrastructure.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
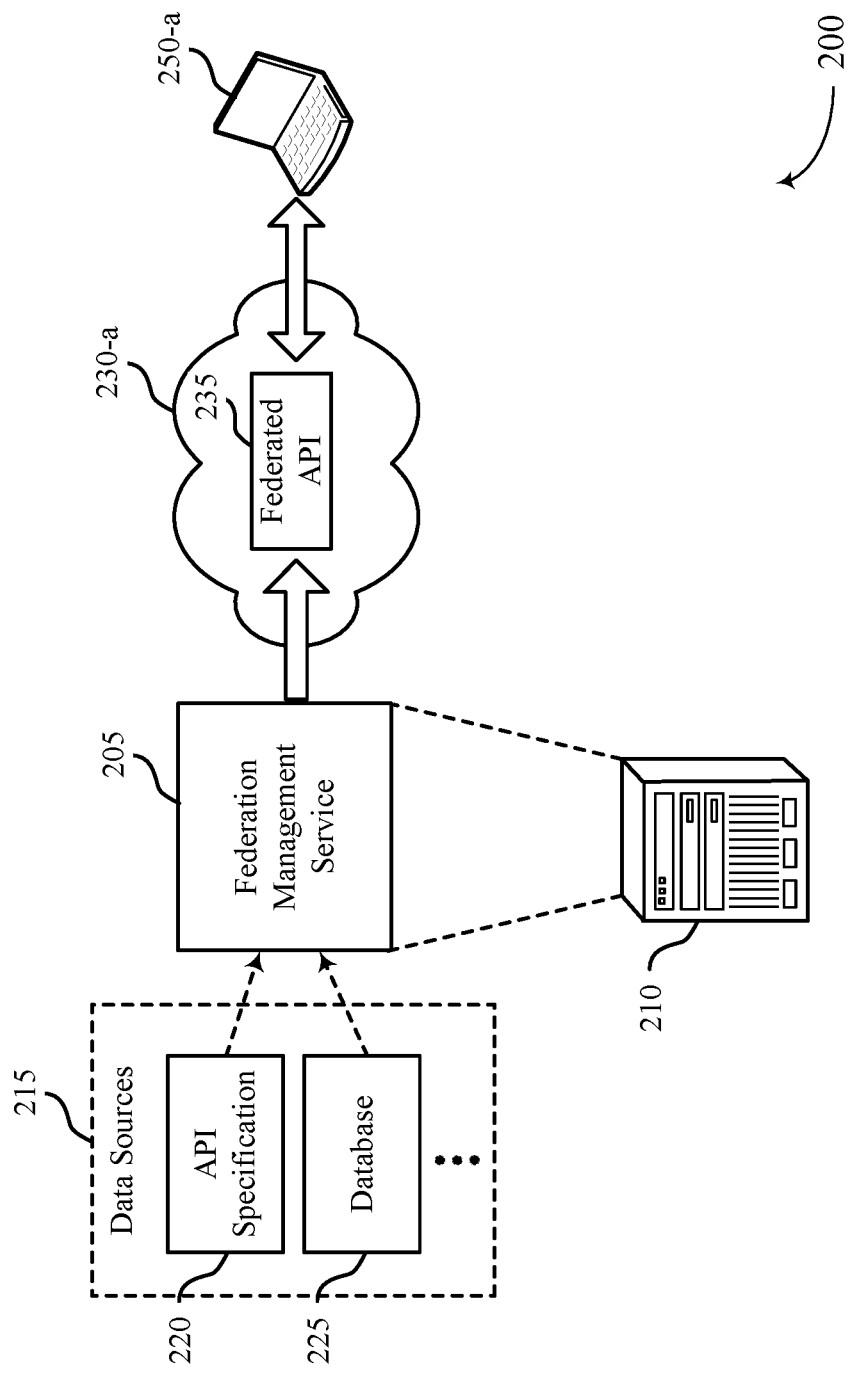
FIG. 2 illustrates an example of a computing environment that supports deployed application programming interface management in accordance with examples as disclosed herein.

FIG. 2 illustrates an example of a computing environment 200 that supports deployed application programming interface management in accordance with examples as disclosed herein. The computing environment 200 includes a server 210, hosts 230, and client devices 250. The server 210 may be an example of aspects of cloud platform 115 of FIG. 1 and/or subsystem 125 of FIG. 1. The server 210 may represent various physical and/or logical computing systems that support a federation management service 205 that may be used by clients or tenants (e.g., cloud client 105 of FIG. 1) in support of applications that are accessible via computing devices, such as client devices 250.

Some applications (e.g., client applications executing on client devices 250, web services, etc.) may retrieve data from multiple data sources, such as data sources 215. For example, an application (or service supported by an application) may provide a status of an online purchase order, and the application may retrieve data related to shipping information from a first data source, data related to order status information from a second data source, and data related to the item being purchased from a third data source. The application may interface with these data sources using respective APIs. The data sources may include RESTful APIs, GraphQL APIs, Async APIs, Google Remote Procedure Call (gRPC) APIs, databases, or the like. Conventional techniques for retrieving data or accessing services may require configuration of multiple APIs at the application and configuration of the application to process the data received from the multiple APIs (e.g., by merging or linking fields via hardcoded relationships).

The federation management service 205 described herein may support the creation of an aggregated or federated API 235 based on multiple data sources 215. In such examples, a user (e.g., an API architect or administrator) may declaratively link elements from multiple APIs using a user interface. The federation management service 205 may generate a new API having a unified schema that incorporates the linked elements across the multiple data sources 215. In some examples, the federated API may be referred to as a datagraph.

The federation management service 205 may support a user interface (UI) that allows a user to select multiple data sources 215 that are to be included in the federated API 235. The user may also select various deployment configurations, such as a host environment (e.g., a host 230-a, which may be an example of cloud environment), endpoint details, authentication details, and the like. After selection of configuration parameters, the federation management service 205 may ingest or process the data sources 215, such as API specification 220 and/or a schema of a database 225, to generate the federated API 235. The federated API 235 may be deployed at the host environment (e.g., host 230-a) based on the user selected parameters. In some examples, the federated API 235 is deployed in a cloud environment (e.g., host 230-a). Additionally, or alternatively, the federated API 235 may be deployed at a local host (e.g., at a host associated with or supported the server 210) or a host associated with the tenant or cloud client.

An application or client (e.g., an application or client executing on client devices 250) may be configured to access an endpoint of the federated API 235 to access data and/or services supported by the underlying data sources 215. As such, rather than accessing the data/services from multiple data source endpoints for each for the data sources 215, the application is configured to access the data/services using the endpoint(s) for the federated API 235, which may support improved computing efficiency (e.g., at the application and the hosts) and reduced complexity.

In some implementations, the federation management service 205 may deploy a federated API 235 on the host 230-a (e.g., based on the API specification 220, using resources stored in the database 225, or both), which may be an example of a private computing infrastructure. The federation management service 205 may deploy a runtime agent that may operate on a runtime plane of the host 230-a and act as a link between the federation management service 205 (that may be operated on a public cloud-based infrastructure, optionally on a control plane) and the federated API 235 (that may be on the private computing infrastructure). The user may then interact with the federation management service 205 (e.g., through a user interface of the federation management service 205) to manage the creation and operation of the federated API 235 even though the federated API 235 is operating on the private computing infrastructure. The federation management service may then communicate (e.g., via control signaling or other communications) with the runtime agent to implement or otherwise carry out the instructions that the user provides. In this way, data security and isolation of the private computing infrastructure may be maintained while still allowing the user to manage the federated API 235 through the federation management service 205 that operates on the public cloud-based infrastructure.

Figure 3:
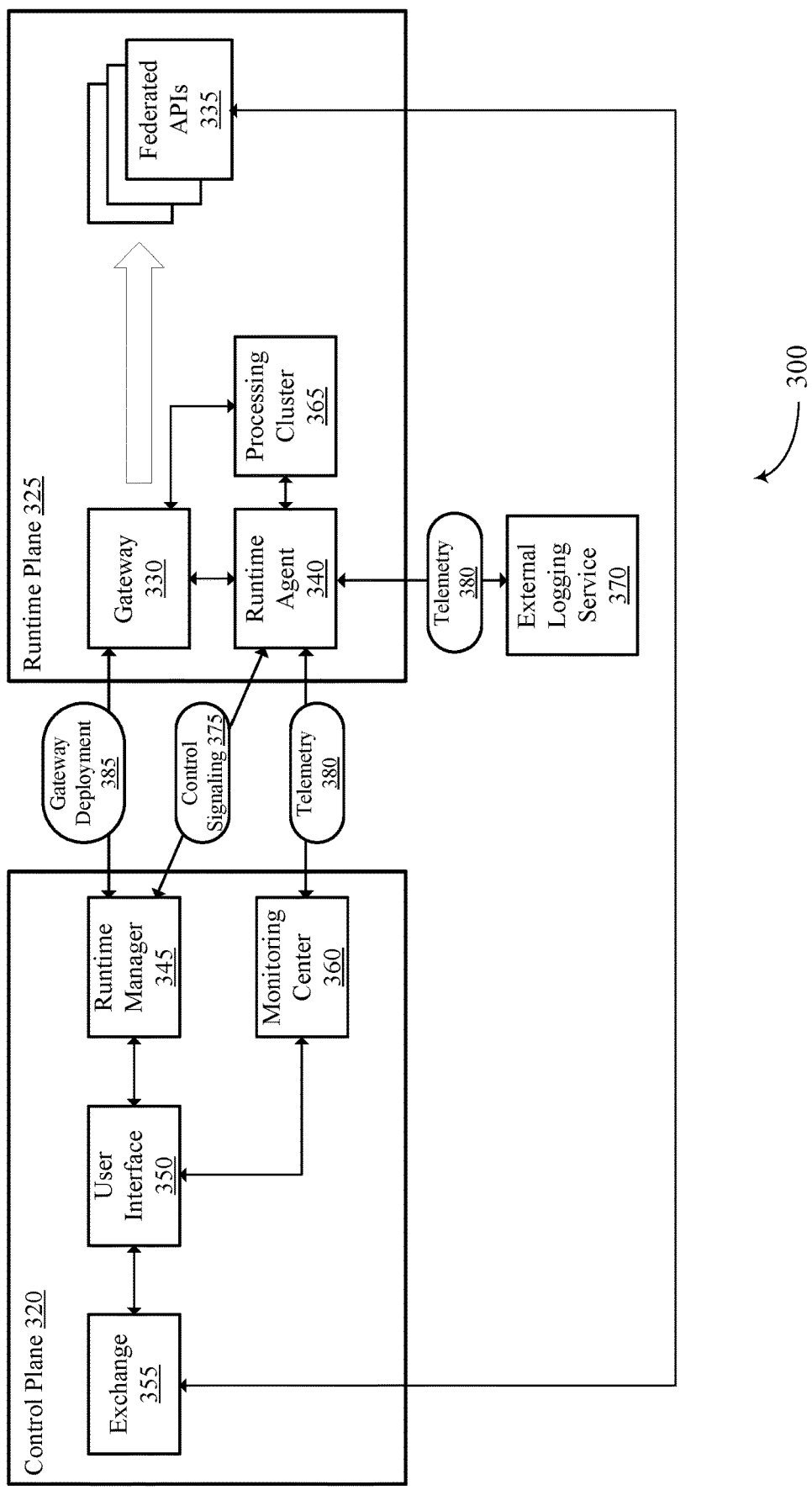
FIG. 3 illustrates an example of an API management scheme that supports deployed application programming interface management in accordance with examples as disclosed herein.

FIG. 3 illustrates an example of an API management scheme 300 that supports deployed application programming interface management in accordance with examples as disclosed herein. The API management scheme 300 may include a control plane 320 (e.g., that may be operated as part of a federation management service, such as the federation management service 205) and a runtime plane 325 (e.g., that may be operated on a private computing infrastructure, such as a client's own computer system that is not publicly accessible). In some examples, the control plane 320 may include or be associated with one or more aspects of a federation management service as described herein. For example, the runtime manager 345, the monitoring center 360, the user interface 350, the exchange 355, one or more additional elements, or any combination thereof may be included in or communicate with such a federation management service to perform the techniques described herein. In some examples, the runtime plane 325 may include or be associated with aspects of the API management scheme 300 that are operated or deployed on a private computing infrastructure, such as a gateway 330, a runtime agent 340, one or more federated APIs 335, a processing cluster 365, or any combination thereof. In some examples, the external logging service 370 may also communicate with one or more elements of the control plane 320, the runtime plane 325, or both (e.g., by receiving or transmitting telemetry 380). Though some particular connections, communications, or flows of information are depicted and discussed, the subject matter is not limited to such examples and in some examples, different configurations of connections, communications, or flows may be employed. For example, any element depicted or discussed may communicate with another depicted or discussed element, directly or indirectly, to implement the techniques described herein.

As described herein, some managed federation services may not use multi-tenant cloud solutions (e.g., software as a service solutions) available on public could infrastructures that use resources that are shared with other customers. In some examples, some managed federation services are instead deployed on private computing infrastructures or computing infrastructures where a public endpoint may not be available.

The subject matter described herein includes techniques for managing a federation service on private computing infrastructures that involve the deployment of the runtime agent 340 on the private computing infrastructure (e.g., on a runtime plane 325) and a corresponding runtime manager 345 on the control plane 320. Such techniques may allow a user to manage the federated APIs 335 that are deployed on the private computing infrastructure without managing many of the details of management that may be present on other systems. For example, the use of the runtime agent 340 and the runtime manager 345 may abstract or hide such details from a user. Through such abstraction, the software that deploys and manages the federation gateway 330 may use the same set of APIs, capabilities, parameters, configurations, or other elements to deploy and manage the federated APIs. In some examples, the runtime manager 345 (optionally along with one or more other elements discussed herein) may be considered to be an "intermediate" control plane that may manage secured communications (e.g., control signaling 375, telemetry 380, or other communications) with the runtime agent 340 (optionally, along with one or more other elements discussed herein) that has been deployed on the private computing infrastructure (or other infrastructure).

Through the use of the subject matter described herein, management of the federated APIs from the user's perspective may be similar or the same whether the federated APIs 335 are running on a publicly-available cloud infrastructure or on a private computing infrastructure. For example, a user may still interact and configure management of the federated APIs 335 through a dashboard of the control plane 320 (e.g., the user interface 350) similarly to how a cloud-based deployment could be configured. The user's selections, commands, or other instructions may be routed through management processes (e.g., through the runtime manager 345) to the federation gateway 330, the runtime agent 340, or both, operating on the private compute infrastructure. The processing cluster 365 may be used to implement some or all of the management functions that are abstracted away from the user or controlled or configured through the use of the control plane 320. In some examples, the processing cluster 365 may also process the actual operations of the federated APIs 335 during operation of the federated APIs 335 (e.g., retrieving, processing, and transmitting data, instructions, or other information in the course of operations of the federated APIs 335).

For example, say that a user wishes to deploy the federated APIs 335 on a private computing infrastructure. The user may initiate the gateway deployment 385 to deploy the gateway 330 on a runtime plane 325 on the private compute infrastructure. In some examples, the runtime agent 340 and the processing cluster 365 may also be deployed on the runtime plane 325 on the private compute infrastructure. The user may then coordinate the creation and management of the federated APIs 335 that are running on the private compute infrastructure though the control plane 320 that is running on another infrastructure (e.g., a publicly accessible cloud computing infrastructure). The user may, through the user interface 350, issue commands, make configuration changes, or initiate other operations associated with the management of the federated APIs 335. The runtime manager 345 may communicate with the runtime agent 340, the gateway 330, one or more other elements, or any combination thereof, to implement the operations indicated by the user. For example, the runtime manager 345 may communicate (e.g., transmit, receive, or both) control signaling 375 with the runtime agent 340 to implement the user's desired operations. The runtime agent 340 may pass commands, information, or both to the processing cluster 365 to implement the user's desired operations to manage the federated APIs 335.

In some examples, the runtime agent 340 may transmit telemetry 380 to the monitoring center 360, the external logging service 370, or both. Such telemetry 380 may include information, logs, history, or other information associated with the operations of the federated APIs 335. The telemetry 380 may be used for monitoring of the federated APIs 335 to generate metrics that may be used to present information to the user (e.g., via the user interface 350) or to automatically make configuration changes to the operation of the federated APIs 335 (e.g., based on one or more rules, thresholds, one or more other factors, or any combination thereof). The external logging service 370 may store and process the telemetry 380 for further analysis, processing, presentation, or any combination thereof. In some examples, the federated APIs 335 may communicate with or be represented in an exchange 355. For example, the exchange 355 may receive a specification or other information associated with one or more of the federated APIs 335 so that the federated APIs 335 may be cataloged, searched, or organized (e.g., so that the user may access or manage the various federated APIs 335).

Figure 4:
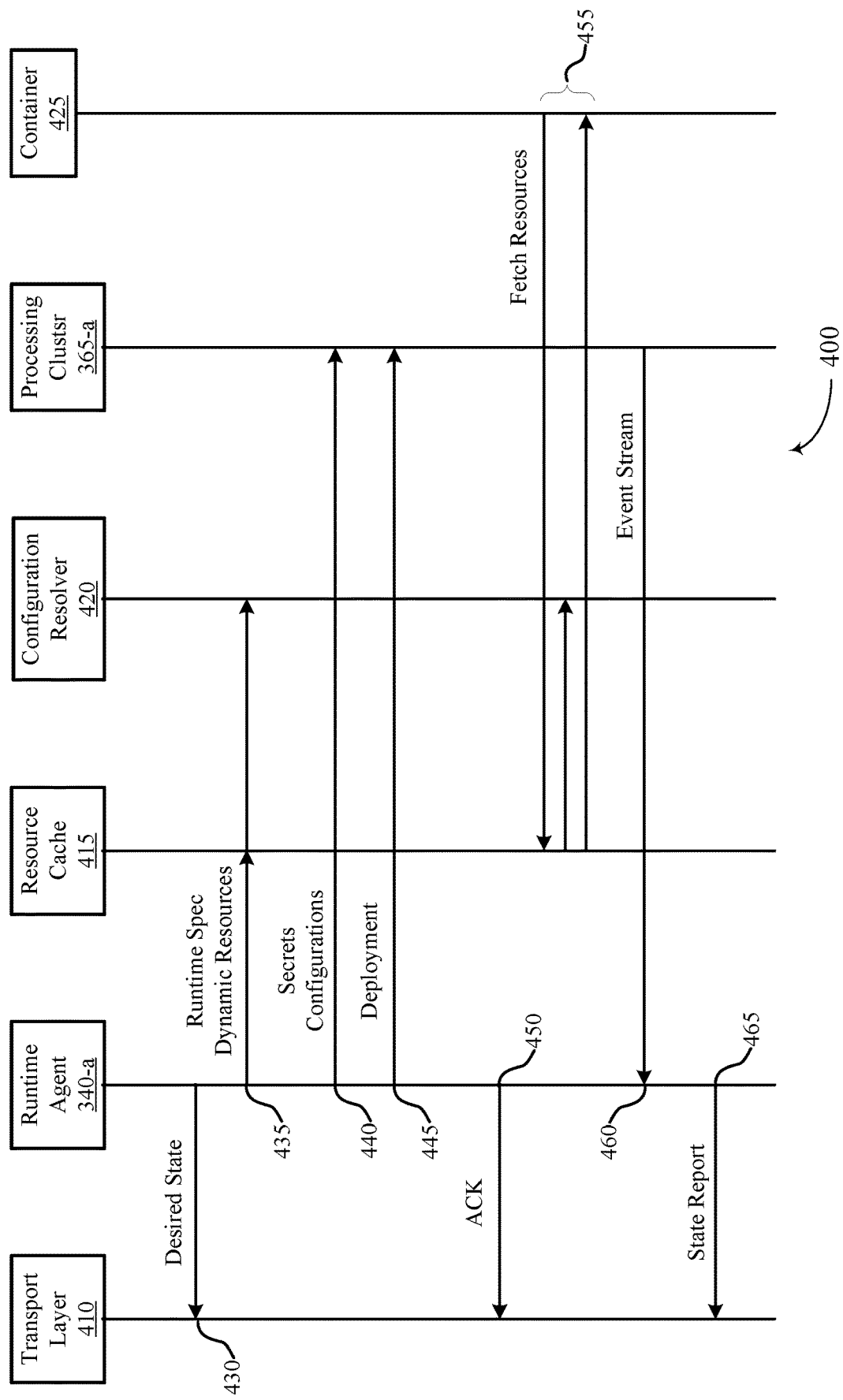
FIG. 4 illustrates an example of a process flow that supports deployed application programming interface management in accordance with examples as disclosed herein.

FIG. 4 illustrates an example of a process flow 400 that supports deployed application programming interface management in accordance with examples as disclosed herein. The process flow 400 may implement various aspects of the present disclosure described herein. For example, the process flow 400 may depict one example of operations of elements of a runtime plane deployed on a private or local computing infrastructure that may operate in conjunction with other elements as described herein. The elements described in the process flow 400 (e.g., the transport layer 410, the runtime agent 340-*a*, the resource cache 415, the configuration resolver 420, the processing cluster 365-*a*, and the container 425) may be examples of similarly-named elements described herein.

In the following description of the process flow 400, the operations between the various entities or elements may be performed in different orders or at different times. Some operations may also be left out of the process flow 400, or other operations may be added. Although the various entities or elements are shown performing the operations of the process flow 400, some aspects of some operations may also be performed by other entities or elements of the process flow 400 or by entities or elements that are not depicted in the process flow, or any combination thereof.

At 430, the runtime agent 340 may transmit a desired state to the transport layer 410. For example, the runtime agent 340 may periodically poll for a desired state that is to be implemented (e.g., a state associated with one or more of the federated APIs 335). Additionally, or alternatively, another element, such as the runtime manager 345, may transmit an indication of the desired state to be implemented to the runtime agent 340.

At 435, the runtime agent 340 may transmit a runtime specification, dynamic resources, or both, to the resource cache 415. The runtime specification, dynamic resources, or both, may, in some cases, be forwarded or directly transmitted to a configuration resolver 420.

At 440, the runtime agent 340 may transmit secrets, configurations, or both, to the processing cluster 365-*a* (e.g., using an API associated with the processing cluster 365-*a*). In some examples, the secrets, configuration, or both may be generated by the runtime agent 340. In some examples, the secrets, configuration, or both may be stored in the container 425 associated with the application. In some examples, the app container may include one or more indicators, include a readiness indicator, a liveliness indicator, or both. In some examples, the runtime agent 340 may also include an ingress resource and a service.

At 445, the runtime agent 340 may deploy the application (e.g., a federated API 335) to the processing cluster 365-a for operation and management of the application. In some examples, the runtime agent 340 may create an application pod that may include the container 425, ephemeral storage, a container for initializing the application, one or more other elements, or any combination thereof. In some examples, the container for initializing the application may retrieve one or more dependencies from the configuration resolver 420 which may be used to initialize the application and prepare it for use.

At 450, the runtime agent 340 may transmit an acknowledgment to the transport layer 410 (e.g., to be transmitted to the runtime manager 345 or other element) that the application has been deployed, that deployment has failed, or that one or more other actions associated with the deployment of the application have occurred.

At 455, the container 425 may fetch (or, alternatively, the resource cache 415 may transmit) resources to be stored at the container 425 associated with the operation of the application (e.g., a federated API 335). For example, the application may run in or be associated with the container 425. The processing cluster 365 may access the resources stored or used in the container 425 for operation and management of the application. In some examples, the resource cache 415 may also transmit resources or one or more indications thereof to the configuration resolver 420.

At 460, the processing cluster 365 may transmit one or more event streams to the runtime agent 340 that may include information about the operation of the application on the processing cluster 365 or information associated with or processed by the application or processing cluster 365. Such information may include history, logs, metrics, metadata, or any combination thereof.

At 465, the runtime agent 340 may transmit one or more state reports to the transport layer 410. Such reports may be transmitted (e.g., in the telemetry 380) to the monitoring center 360 or the external logging service 370 discussed herein, or one or more other elements for storage, processing, or presentation. For example, such state reports may be presented to the user via the user interface 350.

In this way, the runtime manager 345 and the runtime agent 340 described herein may communicate to manage the federated APIs 335 that are operating on the private computing infrastructure (e.g., through one or more of the operations described herein), while user management of such processes occurs through the control plane 320 that is operating on the publicly available cloud infrastructure. Such approaches may include the installation and configuration of the runtime agent 340 on the private infrastructure while avoiding additional installation and management of binaries or other applications. The runtime agent 340 may handle communications between the private infrastructure and the control plane 320 of the provider of the federated management service. Users of such a system may obtain the same or similar management experiences for both privately- and publicly-deployed federated APIs. In this way, data isolation and secure communication for the private infrastructure deployment may be achieved while maintaining management features available at the cloud-based control plane 320, including management of sources, telemetry, and configuration of the federated APIs 335.

Figure 5:
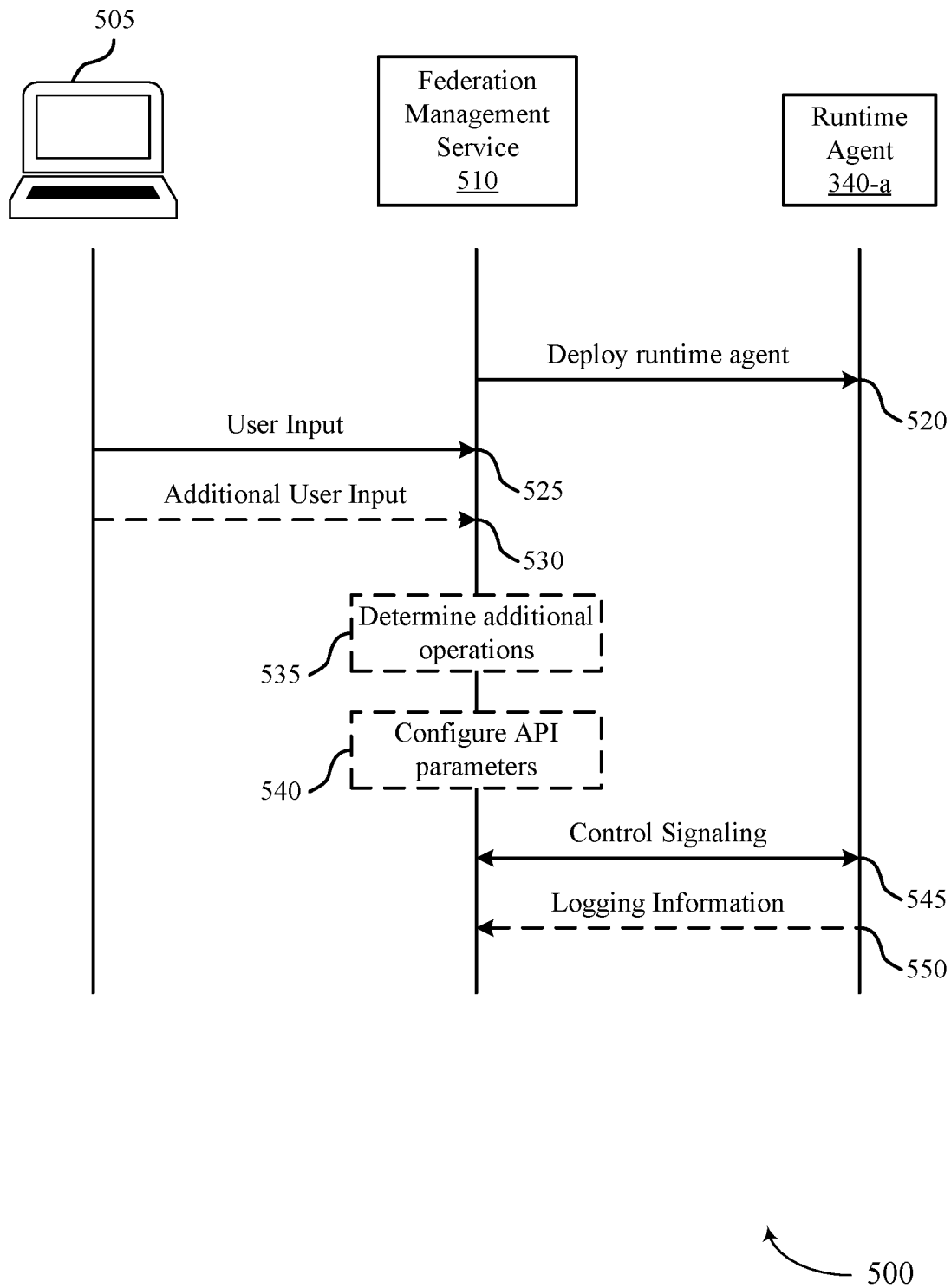
FIG. 5 illustrates an example of a process flow that supports deployed application programming interface management in accordance with examples as disclosed herein.

FIG. 5 illustrates an example of a process flow 500 that supports deployed application programming interface management in accordance with examples as disclosed herein. The process flow 500 may implement various aspects of the present disclosure described herein. The elements described in the process flow 500 (e.g., the client 505, the federation management service 510, and the runtime agent 340-a) may be examples of similarly-named elements described herein.

In the following description of the process flow 500, the operations between the various entities or elements may be performed in different orders or at different times. Some operations may also be left out of the process flow 500, or other operations may be added. Although the various entities or elements are shown performing the operations of the process flow 500, some aspects of some operations may also be performed by other entities or elements of the process flow 500 or by entities or elements that are not depicted in the process flow, or any combination thereof.

At 520, the federation management service 510 may deploy a runtime agent 340-a onto a private compute architecture for running one or more federated APIs on the private compute architecture. In some examples, the private compute architecture operates based on one or more data security restrictions that limit access to the private compute architecture.

At 525, the federation management service 510 may receive, via a user interface of a federation management service, user input to manage an operation of the one or more federated APIs and the federation management service may be hosted on public cloud-based resources. In some examples, the operation may include a management operation of one or more sources associated with the one or more federated APIs.

At 530, the federation management service 510 may receive additional user input that may indicate that the runtime agent 340-a is to monitor activity of the one or more federated APIs and generate logging information based on the activity.

At 535, the federation management service 510 may determine one or more additional operations of the one or more federated APIs based on the user input.

At 540, the federation management service 510 may configure one or more API federation parameters of the one or more federated APIs based on the user input.

At 545, the federation management service 510 may communicate, based on the user input, control signaling between the runtime agent 340-a and a runtime manager that may be hosted on a control plane of the federation management service in the public cloud-based resources. In some examples, the control signaling may be based on the one or more additional operations. In some examples, the control signaling may include the one or more API federation parameters. In some examples, the control signaling may be based on the additional user input.

At 550, the federation management service 510 may receive, at the runtime manager, the logging information from the runtime agent 340-a. In some examples, the federation management service 510 may display the logging information via the user interface.

Figure 6:
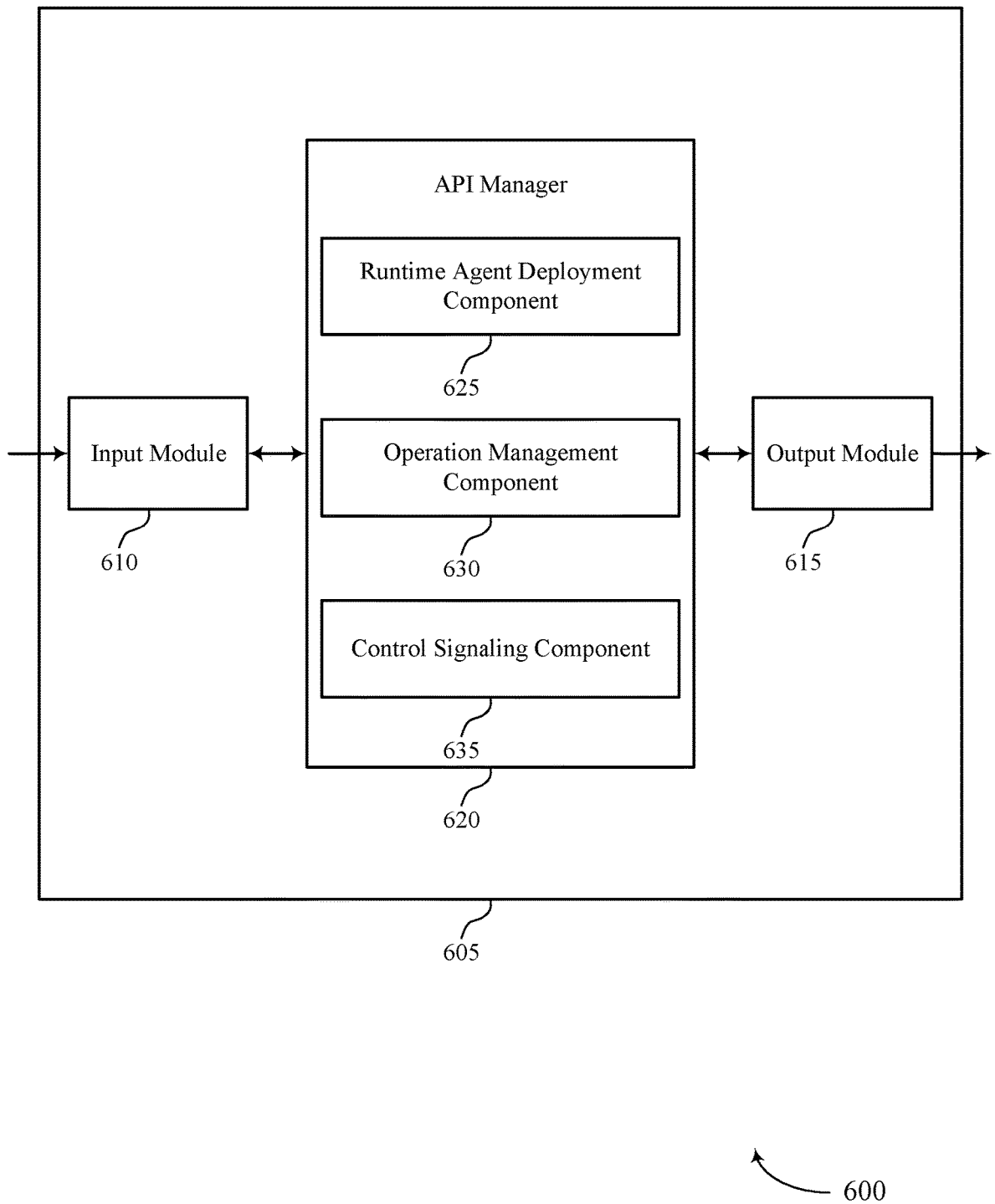
FIG. 6 shows a block diagram of an apparatus that supports deployed application programming interface management in accordance with examples as disclosed herein.

FIG. 6 shows a block diagram 600 of a device 605 that supports deployed application programming interface management in accordance with examples as disclosed herein. The device 605 may include an input module 610, an output module 615, and an API manager 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the API manager 620 to support deployed application programming interface management. In some cases, the input module 610 may be a component of an I/O controller 810 as described with reference to FIG. 8.

The output module 615 may manage output signals for the device 605. For example, the output module 615 may receive signals from other components of the device 605, such as the API manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the API manager 620 may include a runtime agent deployment component 625, an operation management component 630, a control signaling component 635, or any combination thereof. In some examples, the API manager 620, or various components thereof, may be configured to perform various operations (e.g., receiving, monitoring, transmitting) using or otherwise in cooperation with the input module 610, the output module 615, or both. For example, the API manager 620 may receive information from the input module 610, send information to the output module 615, or be integrated in combination with the input module 610, the output module 615, or both to receive information, transmit information, or perform various other operations as described herein.

The API manager 620 may support data processing in accordance with examples as disclosed herein. The runtime agent deployment component 625 may be configured as or otherwise support a means for deploying a runtime agent onto a private compute architecture for running one or more federated application program interfaces (APIs) on the private compute architecture. The operation management component 630 may be configured as or otherwise support a means for receiving, via a user interface of a federation management service, user input to manage an operation of the one or more federated APIs, where the federation management service is hosted on public cloud-based resources. The control signaling component 635 may be configured as or otherwise support a means for communicating, based on the user input, control signaling between the runtime agent and a runtime manager that is hosted on a control plane of the federation management service in the public cloud-based resources.

Figure 7:
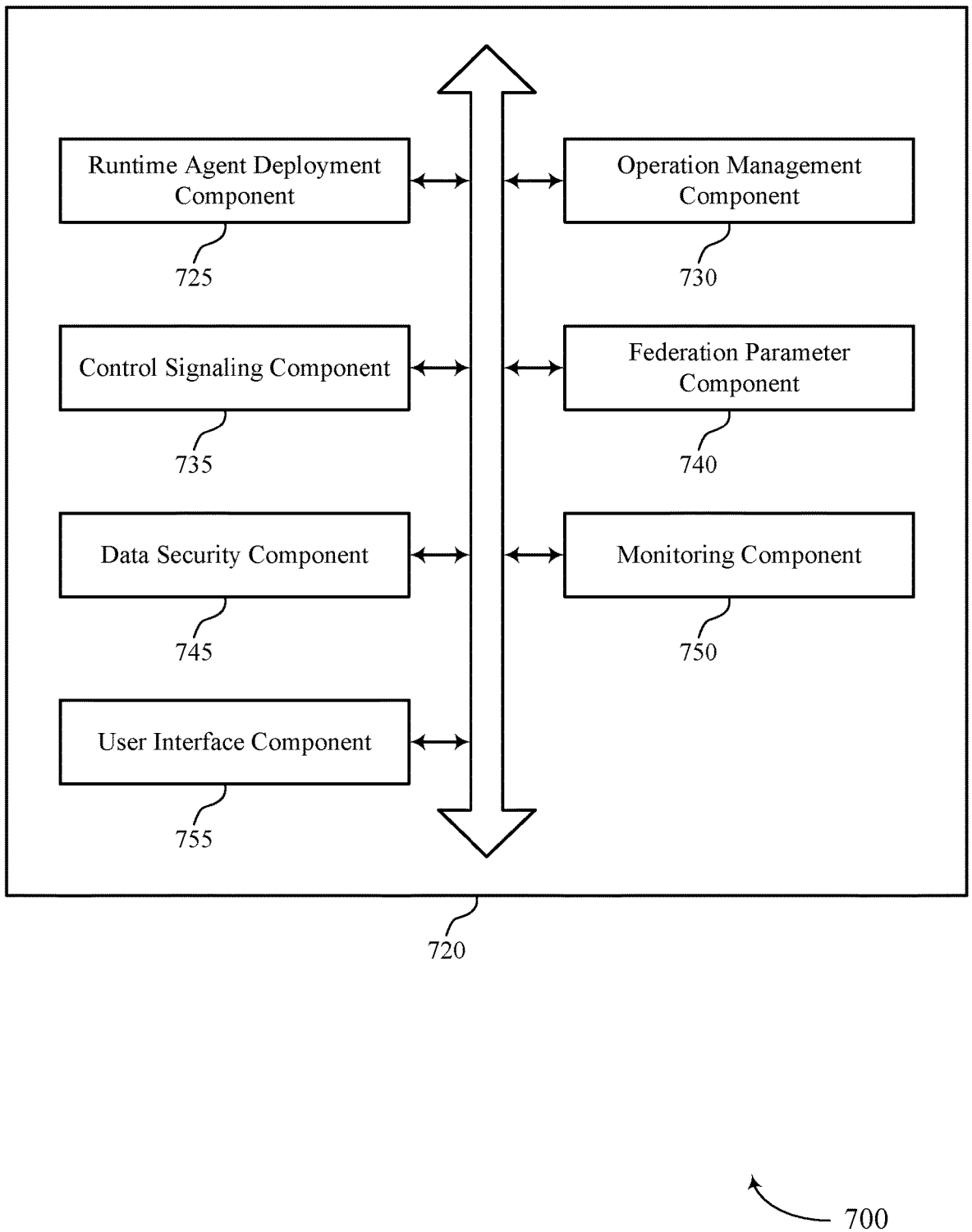
FIG. 7 shows a block diagram of an API manager that supports deployed application programming interface management in accordance with examples as disclosed herein.

FIG. 7 shows a block diagram 700 of an API manager 720 that supports deployed application programming interface management in accordance with examples as disclosed herein. The API manager 720 may be an example of aspects of an API manager or an API manager 620, or both, as described herein. The API manager 720, or various components thereof, may be an example of means for performing various aspects of deployed application programming interface management as described herein. For example, the API manager 720 may include a runtime agent deployment component 725, an operation management component 730, a control signaling component 735, a federation parameter component 740, a data security component 745, a monitoring component 750, a user interface component 755, or any combination thereof. Each of these components may communicate, directly or indirectly, with one another (e.g., via one or more buses).

The API manager 720 may support data processing in accordance with examples as disclosed herein. The runtime agent deployment component 725 may be configured as or otherwise support a means for deploying a runtime agent onto a private compute architecture for running one or more federated application program interfaces (APIs) on the private compute architecture. The operation management component 730 may be configured as or otherwise support a means for receiving, via a user interface of a federation management service, user input to manage an operation of the one or more federated APIs, where the federation management service is hosted on public cloud-based resources. The control signaling component 735 may be configured as or otherwise support a means for communicating, based on the user input, control signaling between the runtime agent and a runtime manager that is hosted on a control plane of the federation management service in the public cloud-based resources.

In some examples, the operation management component 730 may be configured as or otherwise support a means for determining one or more additional operations of the one or more federated APIs based on the user input, where the control signaling is based on the one or more additional operations.

In some examples, the federation parameter component 740 may be configured as or otherwise support a means for configuring one or more API federation parameters of the one or more federated APIs based on the user input, where the control signaling includes the one or more API federation parameters.

In some examples, the private compute architecture operates based on one or more data security restrictions that limit access to the private compute architecture.

In some examples, the monitoring component 750 may be configured as or otherwise support a means for receiving additional user input indicating that the runtime agent is to monitor activity of the one or more federated APIs and generate logging information based on the activity, where the control signaling is based on the additional user input. In some examples, the monitoring component 750 may be configured as or otherwise support a means for receiving, at the runtime manager, the logging information from the runtime agent.

In some examples, the user interface component 755 may be configured as or otherwise support a means for displaying the logging information via the user interface.

In some examples, the operation includes a management operation of one or more sources associated with the one or more federated APIs.

Figure 8:
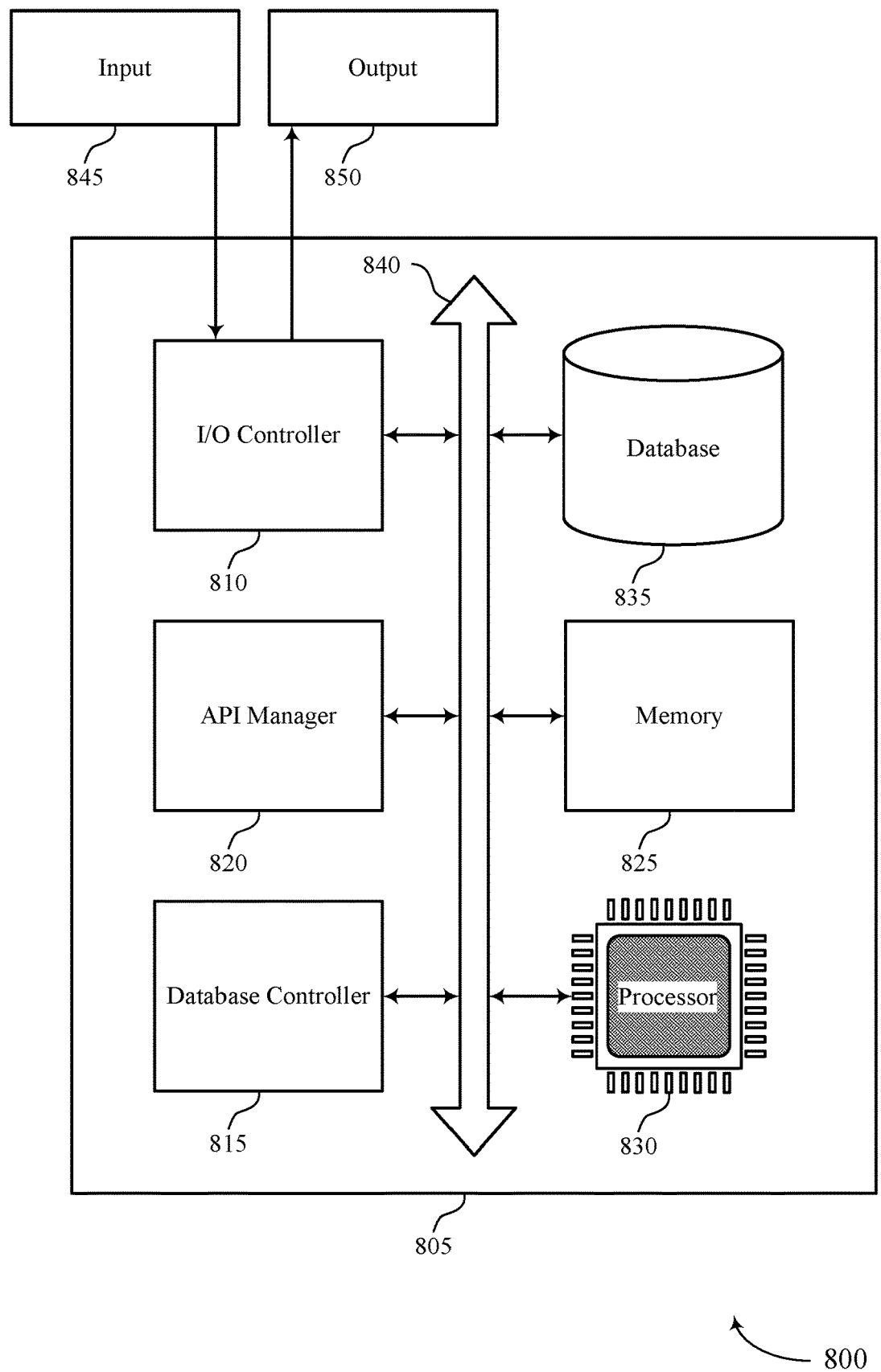
FIG. 8 shows a diagram of a system including a device that supports deployed application programming interface management in accordance with examples as disclosed herein.

FIG. 8 shows a diagram of a system 800 including a device 805 that supports deployed application programming interface management in accordance with examples as disclosed herein. The device 805 may be an example of or include the components of a device 605 as described herein. The device 805 may include components for bi-directional data communications including components for transmitting and receiving communications, such as an API manager 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a BIOS which may control basic hardware or software operation such as the interaction with peripheral components or devices.

The processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting deployed application programming interface management).

The API manager 820 may support data processing in accordance with examples as disclosed herein. For example, the API manager 820 may be configured as or otherwise support a means for deploying a runtime agent onto a private compute architecture for running one or more federated application program interfaces (APIs) on the private compute architecture. The API manager 820 may be configured as or otherwise support a means for receiving, via a user interface of a federation management service, user input to manage an operation of the one or more federated APIs, where the federation management service is hosted on public cloud-based resources. The API manager 820 may be configured as or otherwise support a means for communicating, based on the user input, control signaling between the runtime agent and a runtime manager that is hosted on a control plane of the federation management service in the public cloud-based resources.

By including or configuring the API manager 820 in accordance with examples as described herein, the device 805 may support techniques for deploying a federated API onto local (e.g., non-public) infrastructure, but in a transparent way such that the management of the federated API is still retained or run on cloud-based resources or services.

Figure 9:
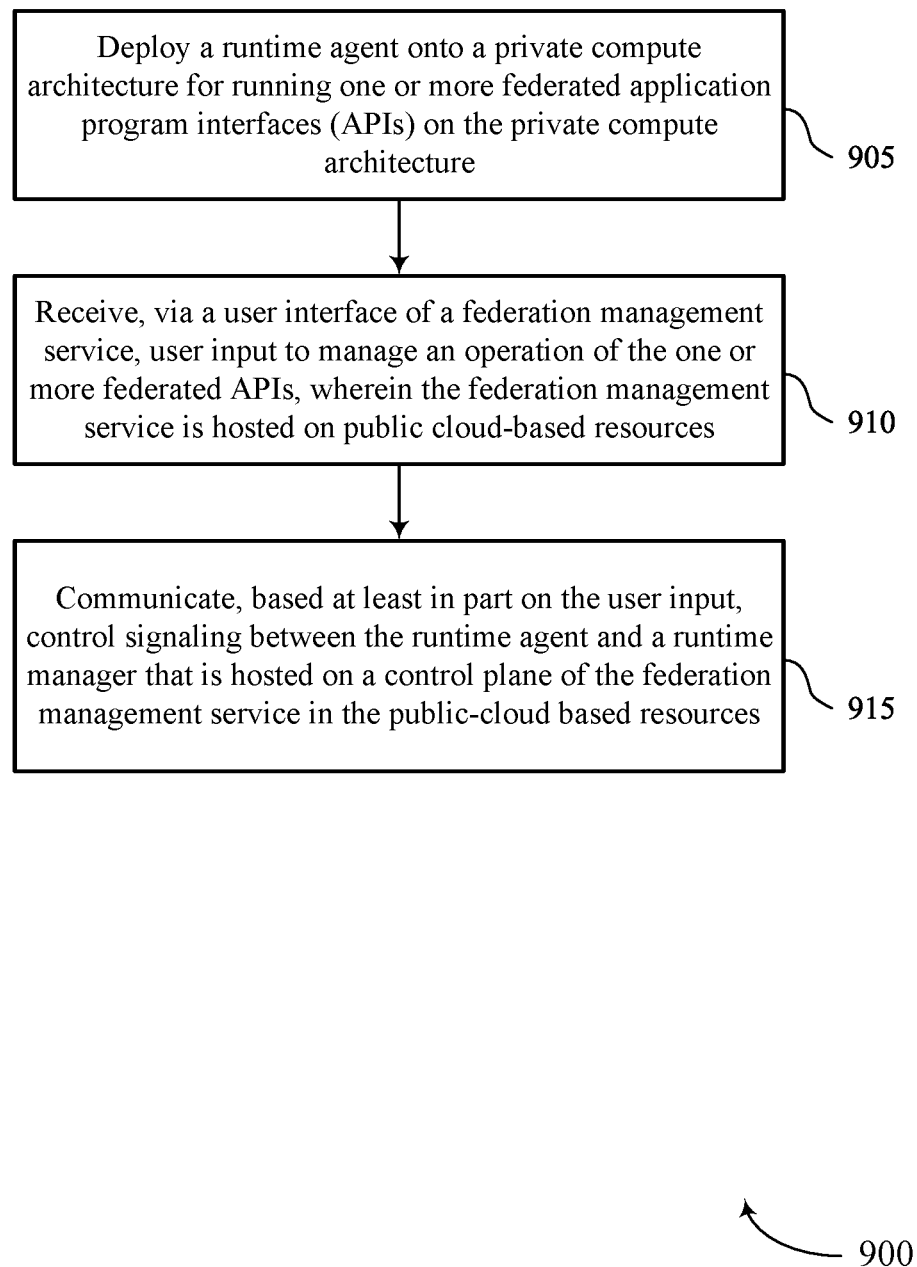
FIGS. 9 through 11 show flowcharts illustrating methods that support deployed application programming interface management in accordance with examples as disclosed herein.

FIG. 9 shows a flowchart illustrating a method 900 that supports deployed application programming interface management in accordance with examples as disclosed herein. The operations of the method 900 may be implemented by a server or its components as described herein. For example, the operations of the method 900 may be performed by a server as described with reference to FIGS. 1 through 8. In some examples, a server may execute a set of instructions to control the functional elements of the server to perform the described functions. Additionally, or alternatively, the server may perform aspects of the described functions using special-purpose hardware.

At 905, the method may include deploying a runtime agent onto a private compute architecture for running one or more federated application program interfaces (APIs) on the private compute architecture. The operations of 905 may be performed in accordance with examples as disclosed herein. In some examples, aspects of the operations of 905 may be performed by a runtime agent deployment component 725 as described with reference to FIG. 7.

At 910, the method may include receiving, via a user interface of a federation management service, user input to manage an operation of the one or more federated APIs, where the federation management service is hosted on public cloud-based resources. The operations of 910 may be performed in accordance with examples as disclosed herein. In some examples, aspects of the operations of 910 may be performed by an operation management component 730 as described with reference to FIG. 7.

At 915, the method may include communicating, based on the user input, control signaling between the runtime agent and a runtime manager that is hosted on a control plane of the federation management service in the public cloud-based resources. The operations of 915 may be performed in accordance with examples as disclosed herein. In some examples, aspects of the operations of 915 may be performed by a control signaling component 735 as described with reference to FIG. 7.

Figure 10:
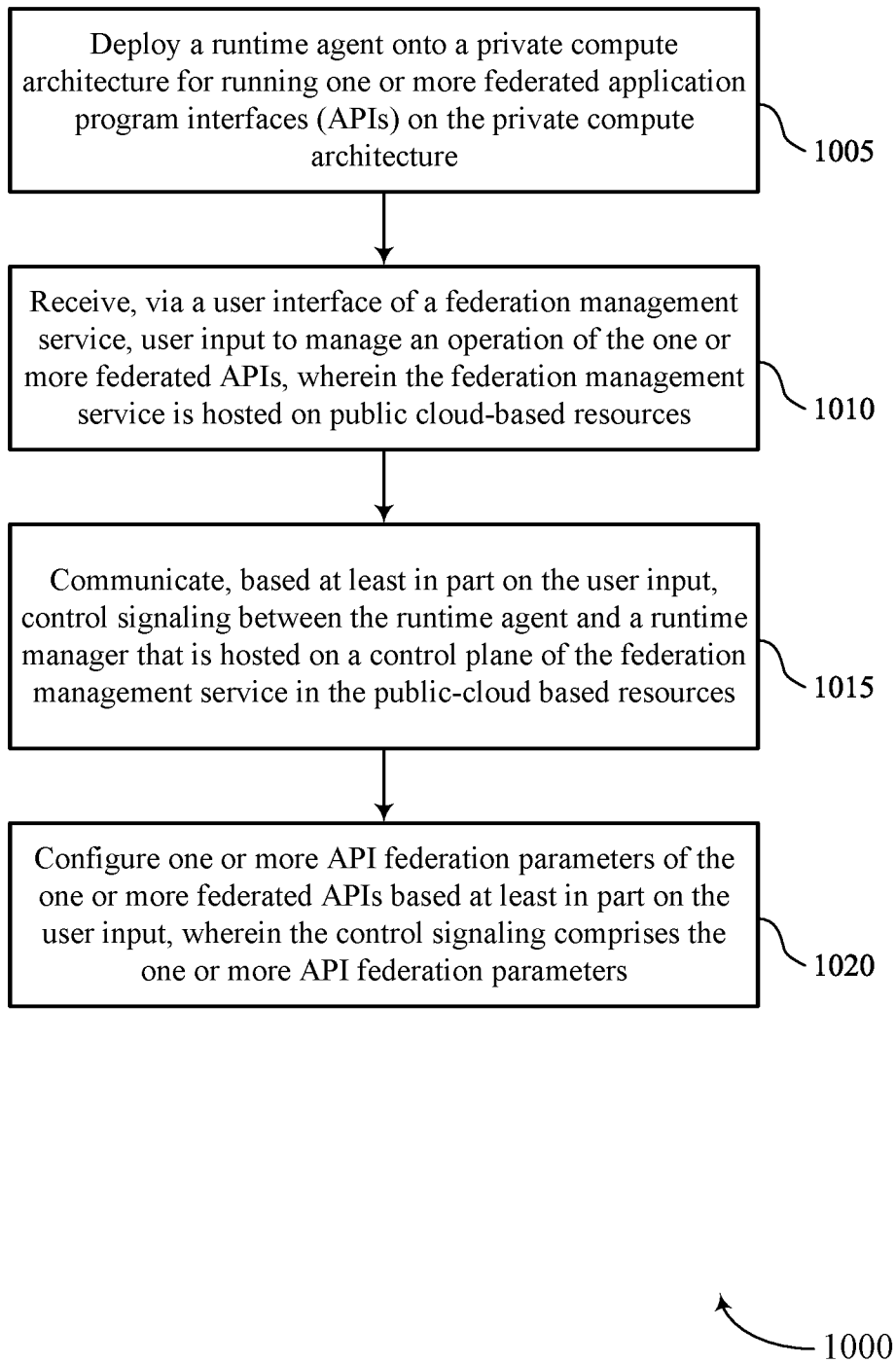

FIG. 10 shows a flowchart illustrating a method 1000 that supports deployed application programming interface management in accordance with examples as disclosed herein. The operations of the method 1000 may be implemented by a server or its components as described herein. For example, the operations of the method 1000 may be performed by a server as described with reference to FIGS. 1 through 8. In some examples, a server may execute a set of instructions to control the functional elements of the server to perform the described functions. Additionally, or alternatively, the server may perform aspects of the described functions using special-purpose hardware.

At 1005, the method may include deploying a runtime agent onto a private compute architecture for running one or more federated application program interfaces (APIs) on the private compute architecture. The operations of 1005 may be performed in accordance with examples as disclosed herein. In some examples, aspects of the operations of 1005 may be performed by a runtime agent deployment component 725 as described with reference to FIG. 7.

At 1010, the method may include receiving, via a user interface of a federation management service, user input to manage an operation of the one or more federated APIs, where the federation management service is hosted on public cloud-based resources. The operations of 1010 may be performed in accordance with examples as disclosed herein. In some examples, aspects of the operations of 1010 may be performed by an operation management component 730 as described with reference to FIG. 7.

At 1015, the method may include communicating, based on the user input, control signaling between the runtime agent and a runtime manager that is hosted on a control plane of the federation management service in the public cloud-based resources. The operations of 1015 may be performed in accordance with examples as disclosed herein. In some examples, aspects of the operations of 1015 may be performed by a control signaling component 735 as described with reference to FIG. 7.

At 1020, the method may include configuring one or more API federation parameters of the one or more federated APIs based on the user input, where the control signaling includes the one or more API federation parameters. The operations of 1020 may be performed in accordance with examples as disclosed herein. In some examples, aspects of the operations of 1020 may be performed by a federation parameter component 740 as described with reference to FIG. 7.

Figure 11:
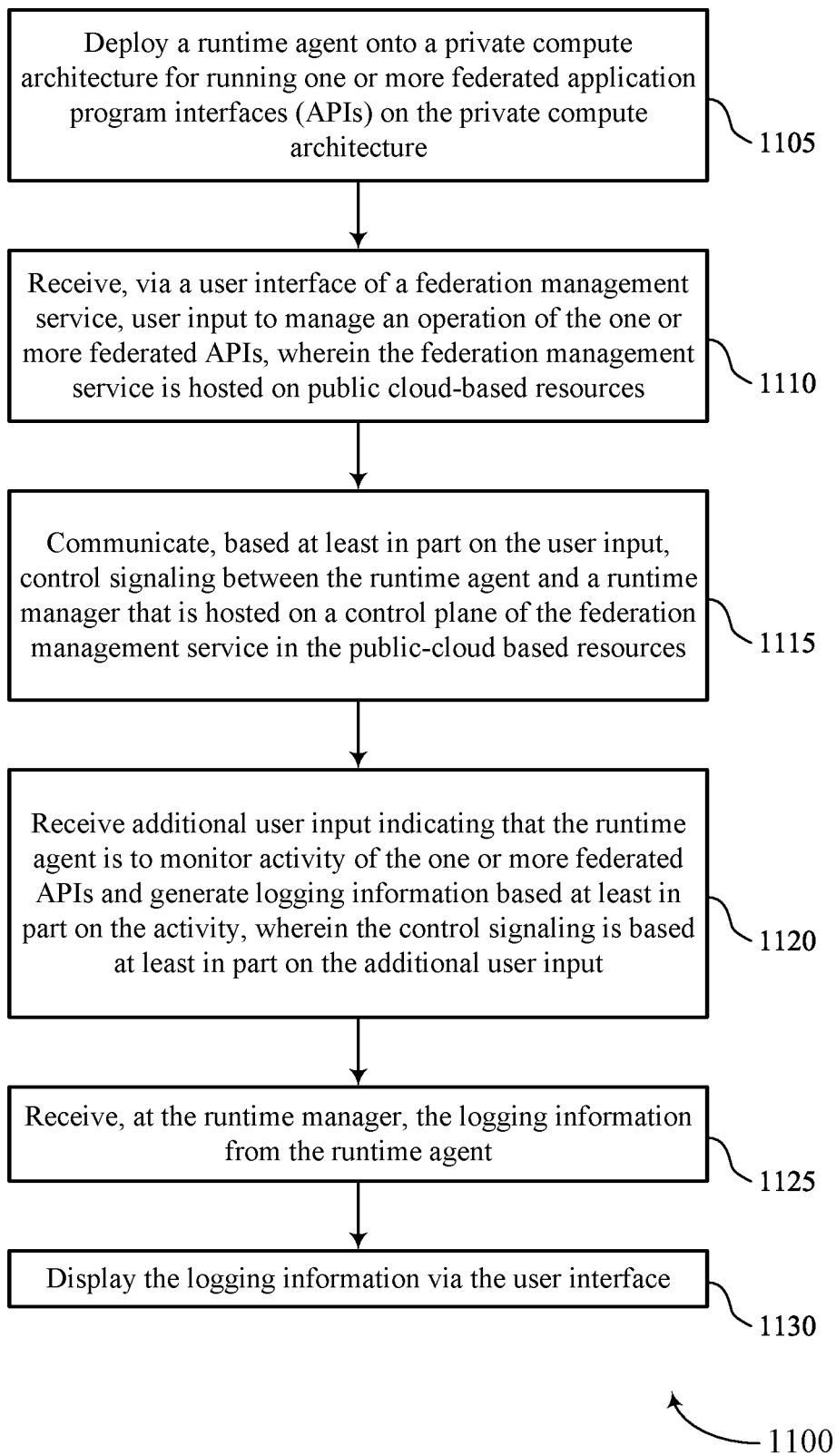

FIG. 11 shows a flowchart illustrating a method 1100 that supports deployed application programming interface management in accordance with examples as disclosed herein. The operations of the method 1100 may be implemented by a server or its components as described herein. For example, the operations of the method 1100 may be performed by a server as described with reference to FIGS. 1 through 8. In some examples, a server may execute a set of instructions to control the functional elements of the server to perform the described functions. Additionally, or alternatively, the server may perform aspects of the described functions using special-purpose hardware.

At 1105, the method may include deploying a runtime agent onto a private compute architecture for running one or more federated application program interfaces (APIs) on the private compute architecture. The operations of 1105 may be performed in accordance with examples as disclosed herein. In some examples, aspects of the operations of 1105 may be performed by a runtime agent deployment component 725 as described with reference to FIG. 7.

At 1110, the method may include receiving, via a user interface of a federation management service, user input to manage an operation of the one or more federated APIs, where the federation management service is hosted on public cloud-based resources. The operations of 1110 may be performed in accordance with examples as disclosed herein. In some examples, aspects of the operations of 1110 may be performed by an operation management component 730 as described with reference to FIG. 7.

At 1115, the method may include communicating, based on the user input, control signaling between the runtime agent and a runtime manager that is hosted on a control plane of the federation management service in the public cloud-based resources. The operations of 1115 may be performed in accordance with examples as disclosed herein. In some examples, aspects of the operations of 1115 may be performed by a control signaling component 735 as described with reference to FIG. 7.

At 1120, the method may include receiving additional user input indicating that the runtime agent is to monitor activity of the one or more federated APIs and generate logging information based on the activity, where the control signaling is based on the additional user input. The operations of 1120 may be performed in accordance with examples as disclosed herein. In some examples, aspects of the operations of 1120 may be performed by a monitoring component 750 as described with reference to FIG. 7.

At 1125, the method may include receiving, at the runtime manager, the logging information from the runtime agent. The operations of 1125 may be performed in accordance with examples as disclosed herein. In some examples, aspects of the operations of 1125 may be performed by a monitoring component 750 as described with reference to FIG. 7.

At 1130, the method may include displaying the logging information via the user interface. The operations of 1130 may be performed in accordance with examples as disclosed herein. In some examples, aspects of the operations of 1130 may be performed by a user interface component 755 as described with reference to FIG. 7.

A method for data processing is described. The method may include deploying a runtime agent onto a private compute architecture for running one or more federated APIs on the private compute architecture, receiving, via a user interface of a federation management service, user input to manage an operation of the one or more federated access point, where the federation management service is hosted on public cloud-based resources, and communicating, based on the user input, control signaling between the runtime agent and a runtime manager that is hosted on a control plane of the federation management service in the public cloud-based resources.

An apparatus for data processing is described. The apparatus may include a processor, memory coupled with the processor, and instructions stored in the memory. The instructions may be executable by the processor to cause the apparatus to deploy a runtime agent onto a private compute architecture for running one or more federated APIs on the private compute architecture, receive, via a user interface of a federation management service, user input to manage an operation of the one or more federated APIs, where the federation management service is hosted on public cloud-based resources, and communicate, based on the user input, control signaling between the runtime agent and a runtime manager that is hosted on a control plane of the federation management service in the public cloud-based resources.

Another apparatus for data processing is described. The apparatus may include means for deploying a runtime agent onto a private compute architecture for running one or more federated APIs on the private compute architecture, means for receiving, via a user interface of a federation management service, user input to manage an operation of the one or more federated APIs, where the federation management service is hosted on public cloud-based resources, and means for communicating, based on the user input, control signaling between the runtime agent and a runtime manager that is hosted on a control plane of the federation management service in the public cloud-based resources.

A non-transitory computer-readable medium storing code for data processing is described. The code may include instructions executable by a processor to deploy a runtime agent onto a private compute architecture for running one or more federated APIs on the private compute architecture, receive, via a user interface of a federation management service, user input to manage an operation of the one or more federated APIs, where the federation management service is hosted on public cloud-based resources, and communicate, based on the user input, control signaling between the runtime agent and a runtime manager that is hosted on a control plane of the federation management service in the public cloud-based resources.

Some examples of the method, apparatuses, and non-transitory computer-readable medium described herein may further include operations, features, means, or instructions for determining one or more additional operations of the one or more federated APIs based on the user input, where the control signaling may be based on the one or more additional operations.

Some examples of the method, apparatuses, and non-transitory computer-readable medium described herein may further include operations, features, means, or instructions for configuring one or more API federation parameters of the one or more federated APIs based on the user input, where the control signaling includes the one or more API federation parameters.

In some examples of the method, apparatuses, and non-transitory computer-readable medium described herein, the private compute architecture operates based on one or more data security restrictions that limit access to the private compute architecture.

Some examples of the method, apparatuses, and non-transitory computer-readable medium described herein may further include operations, features, means, or instructions for receiving additional user input indicating that the runtime agent may be to monitor activity of the one or more federated APIs and generate logging information based on the activity, where the control signaling may be based on the additional user input and receiving, at the runtime manager, the logging information from the runtime agent.

Some examples of the method, apparatuses, and non-transitory computer-readable medium described herein may further include operations, features, means, or instructions for displaying the logging information via the user interface.

In some examples of the method, apparatuses, and non-transitory computer-readable medium described herein, the operation includes a management operation of one or more sources associated with the one or more federated APIs.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
deploying a runtime agent onto a private compute architecture for running one or more federated application program interfaces (APIs) on the private compute architecture wherein the one or more federated APIs are limited to operation within resources of the private compute architecture;
receiving, via a user interface of a federation management service, user input to manage an operation of the one or more federated APIs on the private compute architecture, wherein the federation management service is hosted on public cloud-based resources that are different than the resources of the private compute architecture;
communicating, based at least in part on the user input, control signaling between the runtime agent and a runtime manager that is hosted on a control plane of the federation management service in the public cloud-based resources; and
modifying a configuration associated with the operation of the one or more federated APIs based at least in part on logging information received at the control plane that satisfies an automatic configuration modification rule.

2. The method of claim 1, further comprising:
determining one or more additional operations of the one or more federated APIs based at least in part on the user input, wherein the control signaling is based at least in part on the one or more additional operations.

3. The method of claim 1, further comprising:
configuring one or more API federation parameters of the one or more federated APIs based at least in part on the user input, wherein the control signaling comprises the one or more API federation parameters.

4. The method of claim 1, wherein the private compute architecture operates based at least in part on one or more data security restrictions that limit access to the private compute architecture.

5. The method of claim 1, further comprising:
receiving additional user input indicating that the runtime agent is to monitor activity of the one or more federated APIs and generate logging information based at least in part on the activity, wherein the control signaling is based at least in part on the additional user input; and
receiving, at the runtime manager, the logging information from the runtime agent.

6. The method of claim 5, further comprising:
displaying the logging information via the user interface.

7. The method of claim 1, wherein the operation comprises a management operation of one or more sources associated with the one or more federated APIs.

8. An apparatus for data processing, comprising:
one or more processors;
memory coupled with the one or more processors; and
instructions stored in the memory and executable by the one or more processors to cause the apparatus to:
deploy a runtime agent onto a private compute architecture for running one or more federated application program interfaces (APIs) on the private compute architecture, wherein the one or more federated APIs are limited to operation within resources of the private compute architecture;
receive, via a user interface of a federation management service, user input to manage an operation of the one or more federated APIs on the private compute architecture, wherein the federation management service is hosted on public cloud-based resources that are different than the resources of the private compute architecture;
communicate, based at least in part on the user input, control signaling between the runtime agent and a runtime manager that is hosted on a control plane of the federation management service in the public cloud-based resources; and
modifying a configuration associated with the operation of the one or more federated APIs based at least in part on logging information received at the control plane that satisfies an automatic configuration modification rule.

9. The apparatus of claim 8, wherein the instructions are further executable by the one or more processors to cause the apparatus to:
determine one or more additional operations of the one or more federated APIs based at least in part on the user input, wherein the control signaling is based at least in part on the one or more additional operations.

10. The apparatus of claim 8, wherein the instructions are further executable by the one or more processors to cause the apparatus to:
configure one or more API federation parameters of the one or more federated APIs based at least in part on the user input, wherein the control signaling comprises the one or more API federation parameters.

11. The apparatus of claim 8, wherein the private compute architecture operates based at least in part on one or more data security restrictions that limit access to the private compute architecture.

12. The apparatus of claim 8, wherein the instructions are further executable by the processor to cause the one or more processors to:
receive additional user input indicating that the runtime agent is to monitor activity of the one or more federated APIs and generate logging information based at least in part on the activity, wherein the control signaling is based at least in part on the additional user input; and
receive, at the runtime manager, the logging information from the runtime agent.

13. The apparatus of claim 12, wherein the instructions are further executable by the one or more processors to cause the apparatus to:
display the logging information via the user interface.

14. The apparatus of claim 8, wherein the operation comprises a management operation of one or more sources associated with the one or more federated APIs.

15. A non-transitory computer-readable medium storing code for data processing, the code comprising instructions executable by a processor to:
- deploy a runtime agent onto a private compute architecture for running one or more federated application program interfaces (APIs) on the private compute architecture, wherein the one or more federated APIs are limited to operation within resources of the private compute architecture;
- receive, via a user interface of a federation management service, user input to manage an operation of the one or more federated APIs on the private compute architecture, wherein the federation management service is hosted on public cloud-based resources that are different than the resources of the private compute architecture;
- communicate, based at least in part on the user input, control signaling between the runtime agent and a runtime manager that is hosted on a control plane of the federation management service in the public cloud-based resources; and
- modifying a configuration associated with the operation of the one or more federated APIs based at least in part on logging information received at the control plane that satisfies an automatic configuration modification rule.

16. The non-transitory computer-readable medium of claim 15, wherein the instructions are further executable by the processor to:
- determine one or more additional operations of the one or more federated APIs based at least in part on the user input, wherein the control signaling is based at least in part on the one or more additional operations.

17. The non-transitory computer-readable medium of claim 15, wherein the instructions are further executable by the processor to:
- configure one or more API federation parameters of the one or more federated APIs based at least in part on the user input, wherein the control signaling comprises the one or more API federation parameters.

18. The non-transitory computer-readable medium of claim 15, wherein the private compute architecture operates based at least in part on one or more data security restrictions that limit access to the private compute architecture.

19. The non-transitory computer-readable medium of claim 15, wherein the instructions are further executable by the processor to:
- receive additional user input indicating that the runtime agent is to monitor activity of the one or more federated APIs and generate logging information based at least in part on the activity, wherein the control signaling is based at least in part on the additional user input; and
- receive, at the runtime manager, the logging information from the runtime agent.

20. The non-transitory computer-readable medium of claim 15, wherein the operation comprises a management operation of one or more sources associated with the one or more federated APIs.

* * * * *